(12) United States Patent
Song et al.

(10) Patent No.: US 11,037,111 B2
(45) Date of Patent: Jun. 15, 2021

(54) METHOD FOR ISSUING CURRENCY AND MAKING PAYMENT BY MANAGING BALANCE DATABASE FOR EACH BLOCK IN BLOCKCHAIN NETWORK AND SERVER USING SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: COINPLUG, INC., Seongnam (KR)

( * ) Notice: Subject to any disclaimer, the term of this patent is extended or adjusted under 35 U.S.C. 154(b) by 21 days.

(21) Appl. No.: 16/380,627

(22) Filed: Apr. 10, 2019

(65) Prior Publication Data

US 2019/0236565 A1    Aug. 1, 2019

Related U.S. Application Data

(63) Continuation of application No. PCT/KR2017/011939, filed on Oct. 26, 2017.

(30) Foreign Application Priority Data

Oct. 26, 2016  (KR) .................. 10-2016-0140170

(51) Int. Cl.
*G06Q 20/06* (2012.01)
*G06Q 20/38* (2012.01)
*G06Q 40/02* (2012.01)

(52) U.S. Cl.
CPC ......... *G06Q 20/0658* (2013.01); *G06Q 20/06* (2013.01); *G06Q 20/38* (2013.01);
(Continued)

(58) Field of Classification Search
CPC .............. G06Q 20/00–425; G06Q 40/00–128
See application file for complete search history.

(56) References Cited

U.S. PATENT DOCUMENTS

| 2017/0005804 A1* | 1/2017 | Zinder ............... G06F 21/6254 |
| 2018/0089641 A1* | 3/2018 | Chan ..................... G06Q 40/06 |
| 2018/0204191 A1* | 7/2018 | Wilson ............... G06Q 20/3829 |

FOREIGN PATENT DOCUMENTS

| KR | 10-1575030 B1 | 12/2015 |
| KR | 10-1637854 B1 | 7/2016 |

OTHER PUBLICATIONS

Ron White, How Computers Work, Oct. 15, 2003, Que Publishing, 7th Ed, p. 4. (Year: 2003).*

(Continued)

*Primary Examiner* — Mohammad A. Nilforoush
(74) *Attorney, Agent, or Firm* — Xsensus LLP

(57) ABSTRACT

Provided in the present invention is a method comprising steps of: (a) confirming validity of a currency issuing transaction and a currency issuer when the currency issuing transaction including (i) a specific unique nonce, (ii) a receiver of the currency, (iii) issued amount of the currency, (iv) a public key of the currency issuer, and (v) a signature value of the currency issuer signing the (i), (ii), (iii), and (iv) with a private key of the currency issuer is obtained, and if valid, registering the currency issuing transaction on a private BCDB, wherein registering includes updating a balance database by referencing amount of change in balance due to the issued amount of the currency, included in the currency issuing transaction; and (b) registering, on the public BCDB, a specific representative hash value generated by calculating an associated hash value matching the specific hash value, when a specific condition is satisfied.

16 Claims, 7 Drawing Sheets

(52) U.S. Cl.
CPC ....... *G06Q 20/389* (2013.01); *G06Q 20/3825* (2013.01); *G06Q 20/3829* (2013.01); *G06Q 40/02* (2013.01); *G06Q 2220/00* (2013.01)

(56) References Cited

OTHER PUBLICATIONS

Olaysrud, Thor, "Why Blockchain Can Be Fatal to Your Company", CIO Korea, Sep. 7, 2016, Internet: http://www.ciokorea.com/print/3161, pp. 1-3.

Kangmo Kim, "Bulk Certificate Login Processing", Internet Post, Aug. 5, 2016. <URL: https://github.com/Kangmo/blitz/wiki>. pp. 1-3.

Kim, Kang Mo, "Data Forgery Detection of Private Blockchain using Public Blockchain", GitHub, Aug. 5, 2016, Internet<URL: https://github.com/Kangmo/blitz/wiki/%ED%8D%BC%EB%B8%94%EB%A6%AD-EB%B8%94%EB%AI%9D%EC%B2%B4%EC%9D%B8%EC%9D%84-%ED%99%9C%EC%9A%A9%ED%95%9C-%ED%84%94%EB%9D%BC%EC%9D%B4%EB%B9%97-%EB%B8%94%EB%AI%9D%EC%B2%B4%EC%9D%B8%EC%9D%98-EB%8D%B0%EC%9D%B4%ED%84%B0-EC%9C%84%EB%B3%80%EC%AI%B0-B0-%ED%83%90%EC%A7%80>.

International Search Report for Application No. PCT/KR2017/0011939, dated Jan. 22, 2018.

\* cited by examiner

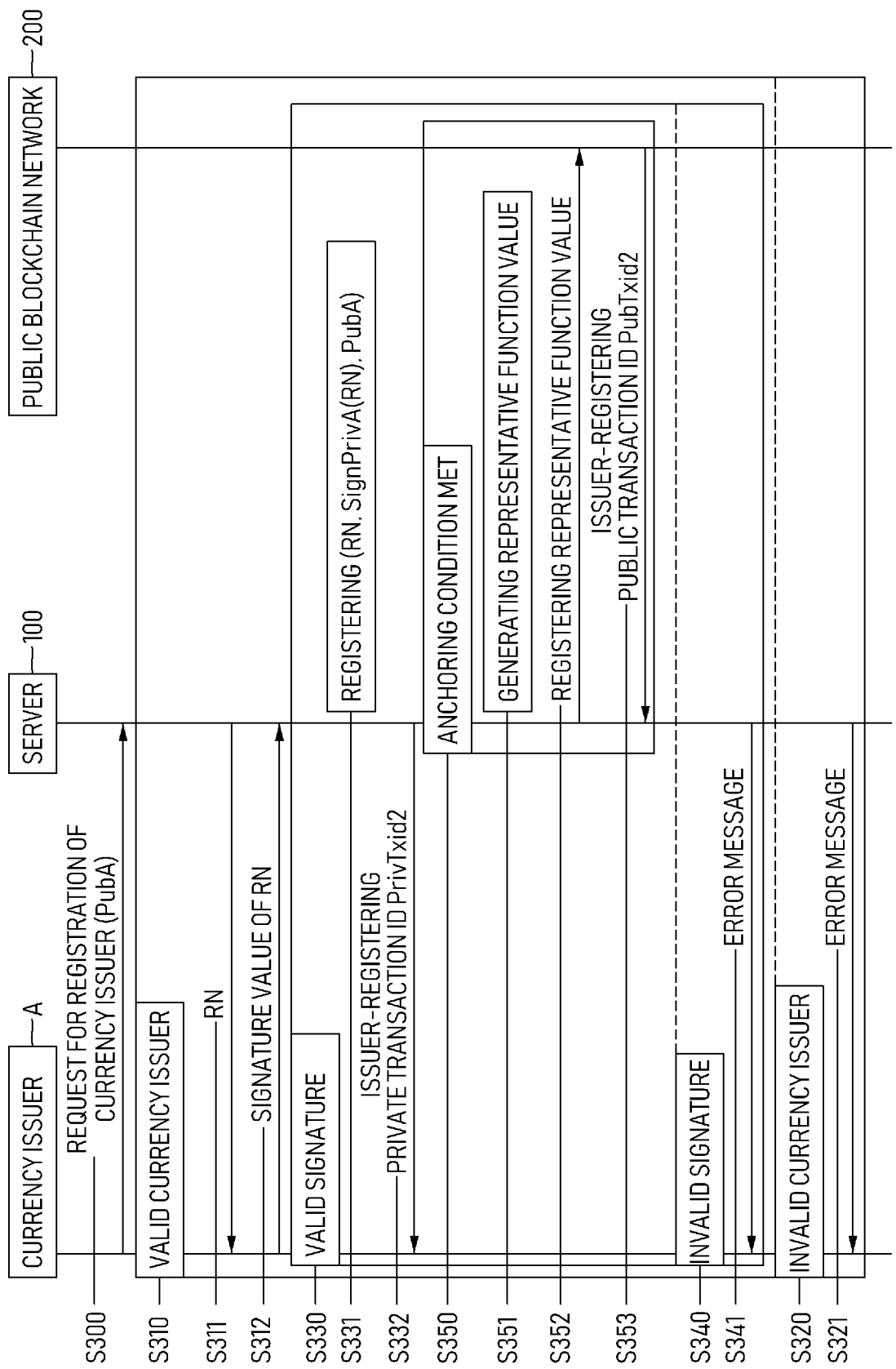

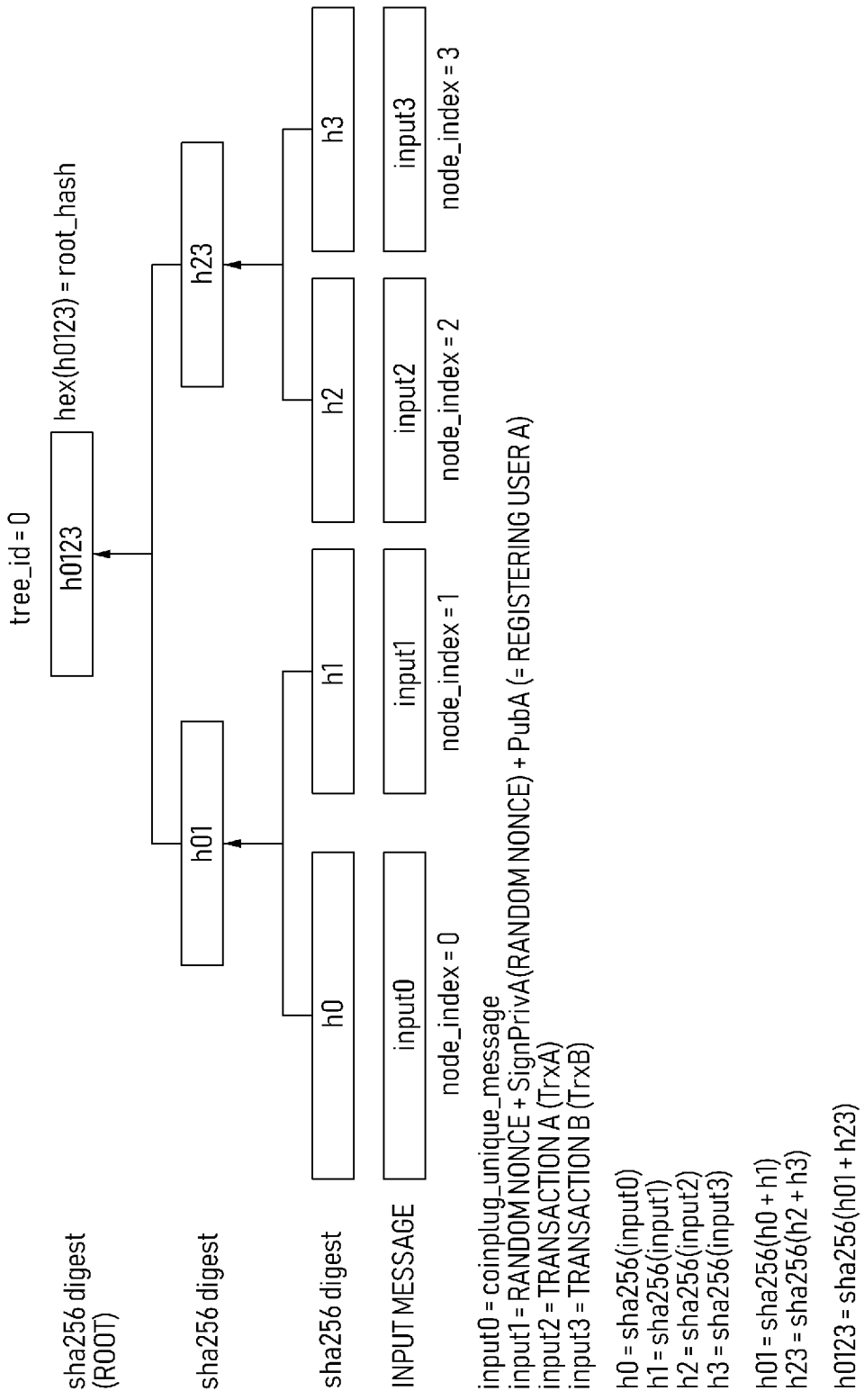

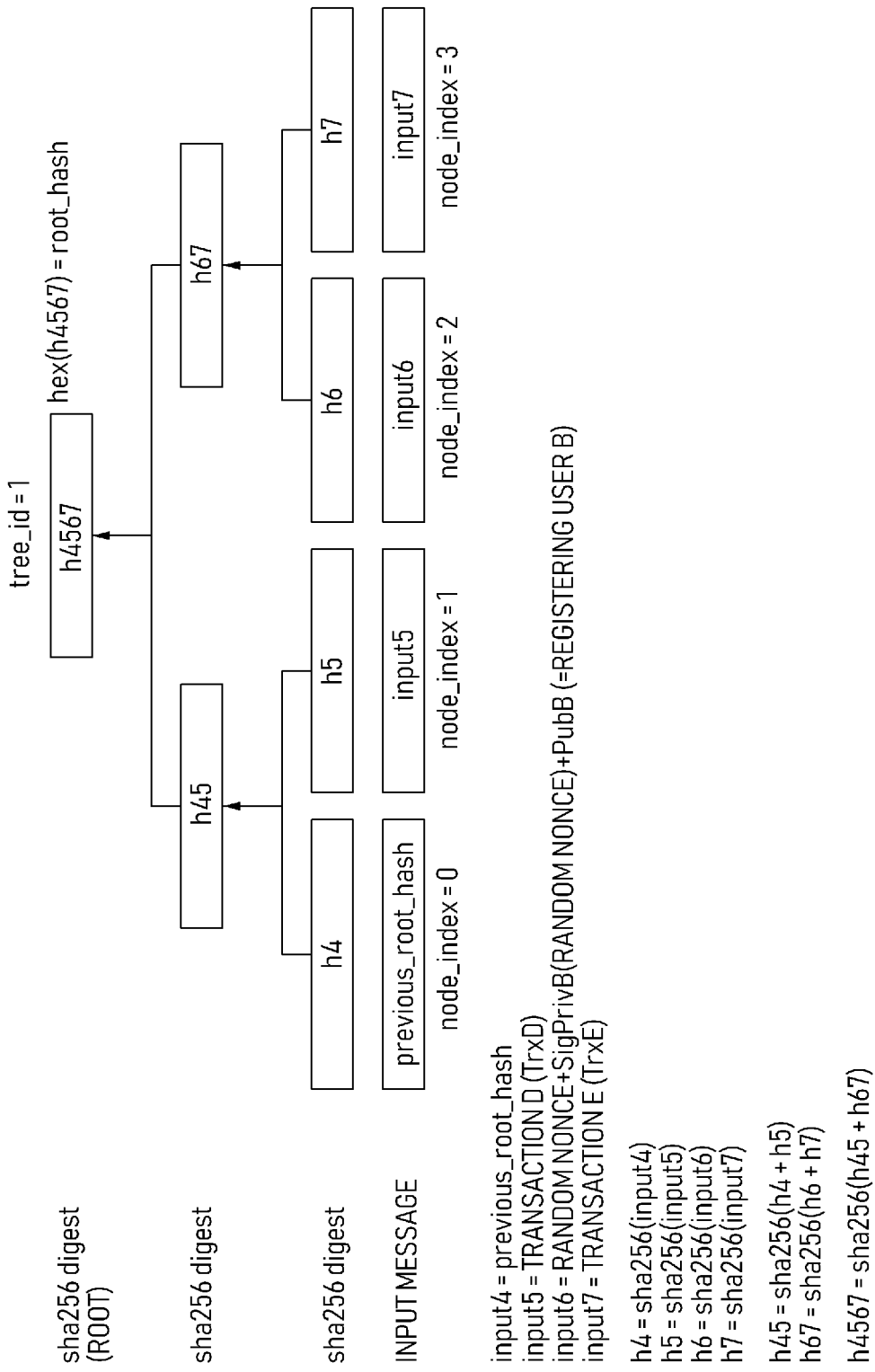

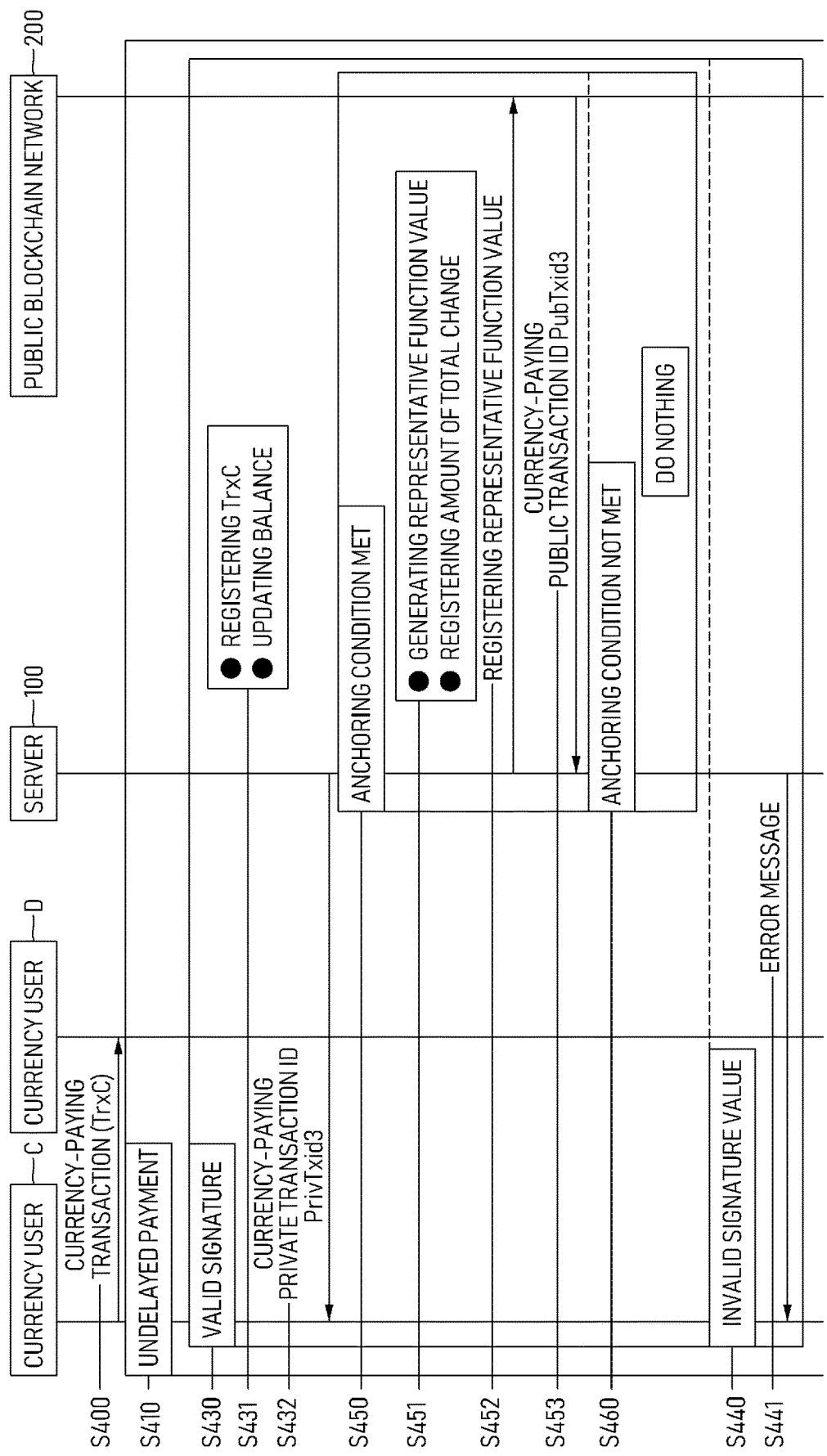

US 11,037,111 B2

METHOD FOR ISSUING CURRENCY AND MAKING PAYMENT BY MANAGING BALANCE DATABASE FOR EACH BLOCK IN BLOCKCHAIN NETWORK AND SERVER USING SAME

CROSS REFERENCE TO RELATED APPLICATIONS

The present application is a continuation of International Application PCT/KR2017/011939, entitled "METHOD FOR ISSUING CURRENCY AND MAKING PAYMENT BY MANAGING BALANCE DATABASE FOR EACH BLOCK IN BLOCKCHAIN NETWORK AND SERVER USING SAME," filed on Oct. 26, 2017, which claims the benefit of Basic Korean Patent Application Serial No. 10-2016-0140170, entitled "METHOD FOR ISSUING AND PAYING MONEY USING MANAGING BALANCE DATABASE BY RESPECTIVE BLOCKS IN BLOCK CHAIN, AND SERVER USING SAME," filed on Oct. 26, 2016, all of which are specifically incorporated by reference for all they disclose and teach.

FIELD OF THE DISCLOSURE

The present disclosure relates to a method for issuing a cryptocurrency; and more particularly, to the method for registering a transaction in a private blockchain network and a public blockchain network, and the server using the same.

BACKGROUND OF THE DISCLOSURE

A currency refers to money in any form when in actual use or circulation as a medium of exchange, especially circulating banknotes and coins, that is, monetary units in payment and commercial distribution, in a nation. Also, some forms of bartering means used exclusively in certain groups may be considered as the currency.

Within a nation, a central bank issues and manages the currency, and banking institutions in a private sector use the issued currency.

Herein, payments between the banking institutions are made via a payment system of the central bank without actual transfer of hard money. That is, the payment is made by deposit and withdrawal in and out of accounts of banks open at the central bank.

However, such a payment system requires settlment of the payments on a daily basis, after close of business of the central bank and the banking institutions.

Also, the settlment of the payments further requires processing of huge payment data, and in case its result has an error, its correction calls for much resources.

Also, illegal copying or forgery of recorded data caused by hacking of the payment system or the banking institutions requires much resources for their corrections.

SUMMARY OF THE DISCLOSURE

It is an object of the present disclosure to solve all the aforementioned problems.

It is another object of the present disclosure to provide a method of recording information on an issuance of a currency or on settling a payment in a blockchain to prevent forgery and illegal copying, and a server using the same.

It is still another object of the present disclosure to provide a method of securing the information on the issuance of the currency or on settling the payment, and preventing the forgery and the illegal copying thereof, by using hash functions and a cryptography, and the server using the same.

It is still yet another object of the present disclosure to provide a method of preventing duplicate payments of the currency, by recording the information on the issuance of the currency or on settling the payment in the the blockchain, and the server using the same.

It is still yet another object of the present disclosure to provide a method of maintaining up-to-date settlement information without a settling procedure between a central bank and banking institutions in a private sector, and the server using the same.

In accordance with one aspect of the present disclosure, there is provided a method for issuing a cryptocurrency, including steps of: (a) a server, if at least one specific currency-issuing transaction including (i) a specific unique nonce, (ii) a currency receiver who receives a specific amount of a cryptocurrency, (iii) an issued amount of the cryptocurrency, (iv) a public key of a currency issuer, and (v) a signature value of the currency issuer generated by signing (i), (ii), (iii), and (iv) with a private key of the currency issuer, is acquired, performing or supporting another device to perform processes of (I) if the specific currency-issuing transaction and the currency issuer are determined as valid, registering the specific currency-issuing transaction in a private blockchain network, (II) providing a specific currency-issuing private transaction ID, representing location information of the specific currency-issuing transaction in the private blockchain network, to at least part of the currency issuer and the currency receiver, and (III) updating a balance database by referring to an amount of a balance change caused by the issued amount included in the specific currency-issuing transaction; and (b) the server, if an anchoring condition used for registering function values in a public blockchain network is satisfied, performing or supporting another device to perform processes of (I) registering a first specific representative function value or its processed value as a representative value in the public blockchain network, wherein the first specific representative function value is generated by using a specific function value and its at least one corresponding specific associated function value among associated function values, wherein the specific function value is generated by applying a specific function to the specific currency-issuing transaction and wherein the specific associated function value is generated by applying the specific function to one of (i) information on an amount of a total change in balances of the balance database changed by all transactions related to the cryptocurrency within an n-th block in the private blockchain network and (ii) information on each of the balances of the balance database, and (II) acquiring a specific currency-issuing public transaction ID representing location information of the first specific representative function value or its processed value in the public blockchain network, wherein the amount of the total change represents amounts of all changes of the cryptocurrency in the n-th block, and the amount of the total change corresponds to a difference between a state of the balance database at a time of completion of the n-th block and a state of the balance database at a time of completion of an (n-1)-th block of the private blockchain network, wherein each state of the balance database is identified by each of private transaction IDs representing each piece of location information corresponding to all the transactions registered in the n-th block, and wherein the balance database includes (i) specific balance information on the specific currency-issuing transaction and (ii) at least one piece of associated balance information on at least one associated transaction among all the transactions.

As one example, at the step of (b), the anchoring condition is one of (i) a condition that a certain number of the transactions related to the cryptocurrency is generated, (ii) a condition that a certain amount of time is elapsed, (iii) a condition that the n-th block is created in the private blockchain network, and (iv) a condition about at least one of characteristics of services.

As one example, the server registers or supports another device to register a header function value in a block header of the n-th block when the n-th block is created in the private blockchain network, and wherein the header function value is a function value calculated from information on each of the balances in the n-th block or from information on the amount of the total change of the balances in the n-th block.

As one example, at the step of (b), on condition that (i) a currency-issuer representative function value has been generated by using a first specific tree of a specific type whose leaf nodes include function values calculated from at least one specific random nonce, at least one signature value of the specific random nonce, and at least one public key of the currency issuer, (ii) a currency-trading representative function value has been generated by using a second specific tree of the specific type whose leaf nodes include function values calculated from all the transactions related to issue and use of the cryptocurrency, and that (iii) the currency-issuer representative function value and the currency-trading representative function value have been further registered in the block header of the n-th block, the server registers or supports another device to register the header function value, the currency-issuer representative function value and the currency-trading representative function value or their processed values in the public blockchain network.

As one example, at the step of (b), on condition that (i) a private representative function value has been generated from a specific tree of a specific type whose leaf nodes include (i-1) at least one function value calculated from at least one specific random nonce, at least one signature value of the specific random nonce and at least one public key of the currency issuer, and (i-2) at least one function value calculated from all the transactions related to issue and use of the cryptocurrency, and that (ii) the private representative function value has been further registered in the block header of the n-th block, the server registers or supports another device to register the header function value and the private representative function value or their processed values in the public blockchain network.

As one example, at the step of (b), the server performs or supports another device to perform (i) a process of creating at least one specific tree of a specific type whose at least one leaf node includes the specific function value, and (ii) a process of registering, if the anchoring condition is satisfied, one of (ii-1) the first specific representative function value calculated by using the specific function value of a specific leaf node and at least one function value allocated to at least one of other leaf nodes corresponding to the specific leaf node and (ii-2) its processed value in the public blockchain network.

As one example, if the specific tree is a first tree among two or more specific trees linked in chains, then a function value of a message data, which includes text, numbers or symbols, or its processed value is allocated to a first leaf node of the specific tree.

As one example, if the anchoring condition is satisfied, the server performs or supports another device to perform processes of (x1) calculating an intermediate value by using (i) the specific function value in the specific leaf node and (ii) a function value allocated to a sibling node of the specific leaf node, and then allocating a function value of the intermediate value to a parent node of the specific leaf node, (x2) registering the function value of the intermediate value in the public blockchain network as the specific representative function value if the parent node is a representative node of the specific tree, and (x3) repeating steps from (x1) to (x3) by regarding the function value of the intermediate value as the specific function value and regarding the parent node as the specific leaf node if the parent node is not the representative node.

As one example, if no function value is allocated to the sibling node of the specific leaf node even though the anchoring condition is satisfied, the server allocates or supports another device to allocate a certain function value to the sibling node then performs or supports another device to perform steps of (x1) to (x3).

As one example, if the server stores the specific function value and the associated associated function values in a first data structure and then stores and manages a second data structure identical in a form to the first data structure, the first data structure and the second data structure are connected in a form of a chain.

As one example, if the first data structure and the second data structure are of a specific type, a representative value of the first data structure or a function value of the representative value is allocated to a first leaf node of the second data structure.

As one example, at the step of (a), the server determines or supports another device to determine whether a data format of the specific currency-issuing transaction, the public key of the currency issuer, and the signature value of the currency issuer are valid, to thereby determine whether the specific currency-issuing transaction is valid, and wherein, if the specific unique nonce is confirmed as having been used in another currency-issuing transaction, the server determines or supports another device to determine that the specific currency-issuing transaction is not valid.

As one example, before the step of (a), the method further comprises steps of: (a01) the server, if a request for registration of the currency issuer using the public key of the currency issuer is acquired, performing or supporting another device to perform processes of determining whether the currency issuer is valid and transmitting a specific random nonce to the currency issuer who is determined as valid; (a02) the server, if a signature value of the specific random nonce generated by signing the specific random nonce with the private key of the currency issuer is acquired, performing or supporting another device to perform processes of (I) determining whether the signature value of the specific random nonce is valid by using the public key of the currency issuer, (II) registering at least one issuer-registering transaction, including (1) the specific random nonce (2) the signature value of the specific random nonce and (3) the public key of the currency issuer, in the public blockchain network, and (III) providing an issuer-registering private transaction ID representing location information of the issuer-registering transaction in the private blockchain network to the currency issuer; and (a03) if the anchoring condition is satisfied, registering a second representative function value or its processed value as a representative value in the public blockchain network, wherein the second representative function value is generated by using (i) a particular function value created by applying the specific function to the issuer-registering transaction and (ii) its at least one corresponding particular associated associated function value, and acquiring an issuer-registering public transaction ID representing location information of the second representative function value or its processed value in the public blockchain network.

In accordance with another aspect of the present disclosure, there is provided a method for settling a payment of a cryptocurrency, including steps of: (a) a server, if at least one specific currency-paying transaction including (i) a specific unique nonce, (ii) information on a currency receiver of a specific part of the currency, (iii) a particular amount of a payment, (iv) a public key of a specific user, and (v) a signature value of the specific user generated by signing (i), (ii), (iii), and (iv) with a private key of the specific user, is acquired, confirming or supporting another device to confirm a payment-settling mode of the specific currency-paying transaction by referring to a balance of the specific user in the specific currency-paying transaction; (b) the server, (I) in case that the payment-settling mode of the specific currency-paying transaction is confirmed as an undelayed payment due to the balance of the specific user being equal to or greater than the particular amount of the payment, if the signature value of the specific user is determined as valid, performing or supporting another device to perform processes of (i) registering the specific currency-paying transaction in a private blockchain network, (ii) providing a specific currency-paying private transaction ID, representing location information of the specific currency-paying transaction in the private blockchain network, to at least part of the specific user and the currency receiver, and (iii) updating a balance database by referring to an amount of a balance change caused by the particular amount of the payment included in the specific currency-paying transaction, (II) in case that the payment-settling mode of the specific currency-paying transaction is confirmed as a delayed payment due to the balance of the specific user being less than the particular amount of the payment, in case that the signature value of the specific user is determined as valid, and in case that at least one associated currency-receiving transaction in which at least one associated user pays the specific user satisfies at least one set-off condition while the specific currency-paying transaction has been stored in a storage part, performing or supporting another device to perform processes of (i) setting-off between the specific currency-paying transaction and the associated currency-receiving transaction, (ii) registering the set-off specific currency-paying transaction and the set-off associated currency-receiving transaction in the private blockchain network, (iii) providing a specific currency-paying private transaction ID and an associated currency-receiving private transaction ID respectively representing location information of the specific currency-paying transaction and the associated currency-receiving transaction in the private blockchain network to at least part of the specific user, the currency receiver, and the associated user, and (iv) updating a balance database by referring to the amount of the balance change caused by the particular amount of the payment included in the associated currency-receiving transaction and the specific currency-paying transaction; and (c) the server, if an anchoring condition used for registering function values in a public blockchain network is satisfied, performing or supporting another device to perform processes of (I) registering a first specific representative function value or its processed value as a representative value in the public blockchain network, wherein the first specific representative function value is generated by using a specific function value and its at least one corresponding specific associated associated function value among associated associated function values, wherein the specific function value is generated by applying a specific function to one of (1) the specific currency-paying transaction and (2) each of the specific currency-paying transaction and the associated currency-receiving transaction and wherein the specific associated associated function value is generated by applying the specific function to one of (i) information on an amount of a total change in balances of the balance database changed by all transactions related to the cryptocurrency within an n-th block in the private blockchain network and (ii) information on each of the balances of the balance database, and (II) acquiring one of (1) a specific currency-issuing public transaction ID representing location information of the first specific representative function value or its processed value in the public blockchain network, and (2) the specific currency-issuing public transaction ID and an associated currency-receiving public transaction ID corresponding to the associated currency-receiving transaction, wherein the amount of the total change represents amounts of all changes of the cryptocurrency in the n-th block, and the amount of the total change corresponds to a difference between a state of the balance database at a time of completion of the n-th block and a state of the balance database at a time of completion of an (n-1)-th block of the private blockchain network, wherein each state of the balance database is identified by each of private transaction IDs representing each piece of location information corresponding to all the transactions registered in the n-th block, and wherein the balance database includes (i) specific balance information on the specific currency-issuing transaction and (ii) at least one piece of associated balance information on at least one associated transaction among all the transactions.

As one example, at the step of (c), the anchoring condition is one of (i) a condition that a certain number of the transactions related to the cryptocurrency is generated, (ii) a condition that a certain amount of time is elapsed, (iii) a condition that the n-th block is created in the private blockchain network, and (iv) a condition about at least one of characteristics of services.

As one example, at the step of (c), the server performs or supports another device to perform (i) a process of creating at least one specific tree of a specific type whose at least one leaf node includes the specific function value, and (ii) a process of registering, if the anchoring condition is satisfied, one of (ii-1) the first specific representative function value calculated by using the specific function value of a specific leaf node and at least one function value allocated to at least one of other leaf nodes corresponding to the specific leaf node and (ii-2) its processed value in the public blockchain network.

As one example, the specific currency-paying transaction further includes information on the payment-settling mode including the delayed payment and the undelayed payment, and wherein, at the step of (b), the server, if the amount of the total balance of the specific user is less than the particular amount even though the information on the payment-settling mode of the specific currency-paying transaction is the undelayed payment, determines or supports another device to determine the payment-settling mode of the specific currency-paying transaction as the delayed payment.

As one example, before the step of (a), the method further comprises steps of: (a01) the server, if a request for registration of the specific user using the public key of the specific user is acquired, performing or supporting another device to perform processes of determining whether the specific user is valid and transmitting a specific random nonce to the specific user who is determined as valid; and (a02) the server, if a signature value of the specific random nonce generated by signing the specific random nonce with the private key of the specific user is acquired, performing or supporting another device to perform processes of (I) determining whether the signature value of the specific random nonce is valid by using the public key of the specific user, (II) registering at least one user-registering transaction, including (1) the specific random nonce (2) the signature value of the specific random nonce and (3) the public key of the specific user, in the public blockchain network, and (III) providing a user-registering private transaction ID representing location information of the user-registering transaction in the private blockchain network to the specific user; and (a03) if the anchoring condition is satisfied, registering a second representative function value or its processed value as a representative value in the public blockchain network, wherein the second representative function value is generated by using (i) a particular function value created by applying the specific function to the user-registering transaction and (ii) its at least one corresponding particular associated associated function value, and acquiring a user-registering public transaction ID representing location information of the second representative function value or its processed value in the public blockchain network.

In accordance with still another aspect of the present disclosure, there is provided a server for issuing a cryptocurrency, including: at least one memory that stores instructions; and at least one processor configured to execute the instructions to perform or support another device to perform processes of: (I) if at least one specific currency-issuing transaction including (i) a specific unique nonce, (ii) a currency receiver who receives a specific amount of a cryptocurrency, (iii) an issued amount of the cryptocurrency, (iv) a public key of a currency issuer, and (v) a signature value of the currency issuer generated by signing (i), (ii), (iii), and (iv) with a private key of the currency issuer, is acquired, (I-1) if the specific currency-issuing transaction and the currency issuer are determined as valid, registering the specific currency-issuing transaction in a private blockchain network, (I-2) providing a specific currency-issuing private transaction ID, representing location information of the specific currency-issuing transaction in the private blockchain network, to at least part of the currency issuer and the currency receiver, and (I-3) updating a balance database by referring to an amount of a balance change caused by the issued amount included in the specific currency-issuing transaction, and (II) if an anchoring condition used for registering function values in a public blockchain network is satisfied, (II-1) registering a first specific representative function value or its processed value as a representative value in the public blockchain network, wherein the first specific representative function value is generated by using a specific function value and its at least one corresponding specific associated function value among associated function values, wherein the specific function value is generated by applying a specific function to the specific currency-issuing transaction and wherein the specific associated function value is generated by applying the specific function to one of (i) information on an amount of a total change in balances of the balance database changed by all transactions related to the cryptocurrency within an n-th block in the private blockchain network and (ii) information on each of the balances of the balance database, and (II-2) acquiring a specific currency-issuing public transaction ID representing location information of the first specific representative function value or its processed value in the public blockchain network, wherein the amount of the total change represents amounts of all changes of the cryptocurrency in the n-th block, and the amount of the total change corresponds to a difference between a state of the balance database at a time of completion of the n-th block and a state of the balance database at a time of completion of an (n-1)-th block of the private blockchain network, wherein each state of the balance database is identified by each of private transaction IDs representing each piece of location information corresponding to all the transactions registered in the n-th block, and wherein the balance database includes (i) specific balance information on the specific currency-issuing transaction and (ii) at least one piece of associated balance information on at least one associated transaction among all the transactions.

As one example, at the process of (II), the anchoring condition is one of (i) a condition that a certain number of the transactions related to the cryptocurrency is generated, (ii) a condition that a certain amount of time is elapsed, (iii) a condition that the n-th block is created in the private blockchain network, and (iv) a condition about at least one of characteristics of services.

As one example, the processor registers or supports another device to register a header function value in a block header of the n-th block when the n-th block is created in the private blockchain network, and wherein the header function value is a function value calculated from information on each of the balances in the n-th block or from information on the amount of the total change of the balances in the n-th block.

As one example, at the process of (II), the processor performs or supports another device to perform (i) a process of creating at least one specific tree of a specific type whose at least one leaf node includes the specific function value, and (ii) a process of registering, if the anchoring condition is satisfied, one of (ii-1) the first specific representative function value calculated by using the specific function value of a specific leaf node and at least one function value allocated to at least one of other leaf nodes corresponding to the specific leaf node and (ii-2) its processed value in the public blockchain network.

As one example, before the process of (I), the processor further executes the instructions to perform or support another device to processes of: (I01) if a request for registration of the currency issuer using the public key of the currency issuer is acquired, determining whether the currency issuer is valid and transmitting a specific random nonce to the currency issuer who is determined as valid; (I02) if a signature value of the specific random nonce generated by signing the specific random nonce with the private key of the currency issuer is acquired, (I) determining whether the signature value of the specific random nonce is valid by using the public key of the currency issuer, (II) registering at least one issuer-registering transaction, including (1) the specific random nonce (2) the signature value of the specific random nonce and (3) the public key of the currency issuer, in the public blockchain network, and (III) providing an issuer-registering private transaction ID representing location information of the issuer-registering transaction in the private blockchain network to the currency issuer; and (I03) if the anchoring condition is satisfied, registering a second representative function value or its processed value as a representative value in the public blockchain network, wherein the second representative function value is generated by using (i) a particular function value created by applying the specific function to the issuer-registering transaction and (ii) its at least one corresponding particular associated associated function value, and acquiring an issuer-registering public transaction ID representing location information of the second representative function value or its processed value in the public blockchain network.

In accordance with still yet another aspect of the present disclosure, there is provided a server for settling a payment of a cryptocurrency, including: at least one memory that stores instructions; and at least one processor configured to execute the instructions to perform or support another device to perform processes of: (I) if at least one specific currency-paying transaction including (i) a specific unique nonce, (ii) information on a currency receiver of a specific part of the currency, (iii) a particular amount of a payment, (iv) a public key of a specific user, and (v) a signature value of the specific user generated by signing (i), (ii), (iii), and (iv) with a private key of the specific user, is acquired, confirming a payment-settling mode of the specific currency-paying transaction by referring to a balance of the specific user in the specific currency-paying transaction, (II) (II-1) in case that the payment-settling mode of the specific currency-paying transaction is confirmed as an undelayed payment due to the balance of the specific user being equal to or greater than the particular amount of the payment, if the signature value of the specific user is determined as valid, (i) registering the specific currency-paying transaction in a private blockchain network, (ii) providing a specific currency-paying private transaction ID, representing location information of the specific currency-paying transaction in the private blockchain network, to at least part of the specific user and the currency receiver, and (iii) updating a balance database by referring to an amount of a balance change caused by the particular amount of the payment included in the specific currency-paying transaction, (II-2) in case that the payment-settling mode of the specific currency-paying transaction is confirmed as a delayed payment due to the balance of the specific user being less than the particular amount of the payment, in case that the signature value of the specific user is determined as valid, and in case that at least one associated currency-receiving transaction in which at least one associated user pays the specific user satisfies at least one set-off condition while the specific currency-paying transaction has been stored in a storage part, (i) setting-off between the specific currency-paying transaction and the associated currency-receiving transaction, (ii) registering the set-off specific currency-paying transaction and the set-off associated currency-receiving transaction in the private blockchain network, (iii) providing a specific currency-paying private transaction ID and an associated currency-receiving private transaction ID respectively representing location information of the specific currency-paying transaction and the associated currency-receiving transaction in the private blockchain network to at least part of the specific user, the currency receiver, and the associated user, and (iv) updating a balance database by referring to the amount of the balance change caused by the particular amount of the payment included in the associated currency-receiving transaction and the specific currency-paying transaction, and (III) if an anchoring condition used for registering function values in a public blockchain network is satisfied, (III-1) registering a first specific representative function value or its processed value as a representative value in the public blockchain network, wherein the first specific representative function value is generated by using a specific function value and its at least one corresponding specific associated associated function value among associated associated function values, wherein the specific function value is generated by applying a specific function to one of (1) the specific currency-paying transaction and (2) each of the specific currency-paying transaction and the associated currency-receiving transaction and wherein the specific associated associated function value is generated by applying the specific function to one of (i) information on an amount of a total change in balances of the balance database changed by all transactions related to the cryptocurrency within an n-th block in the private blockchain network and (ii) information on each of the balances of the balance database, and (III-2) acquiring one of (1) a specific currency-issuing public transaction ID representing location information of the first specific representative function value or its processed value in the public blockchain network, and (2) the specific currency-issuing public transaction ID and an associated currency-receiving public transaction ID corresponding to the associated currency-receiving transaction, wherein the amount of the total change represents amounts of all changes of the cryptocurrency in the n-th block, and the amount of the total change corresponds to a difference between a state of the balance database at a time of completion of the n-th block and a state of the balance database at a time of completion of an (n-1)-th block of the private blockchain network, wherein each state of the balance database is identified by each of private transaction IDs representing each piece of location information corresponding to all the transactions registered in the n-th block, and wherein the balance database includes (i) specific balance information on the specific currency-issuing transaction and (ii) at least one piece of associated balance information on at least one associated transaction among all the transactions.

As one example, at the process of (III), the processor performs or supports another device to perform (i) a process of creating at least one specific tree of a specific type whose at least one leaf node includes the specific function value, and (ii) a process of registering, if the anchoring condition is satisfied, one of (ii-1) the first specific representative function value calculated by using the specific function value of a specific leaf node and at least one function value allocated to at least one of other leaf nodes corresponding to the specific leaf node and (ii-2) its processed value in the public blockchain network.

As one example, before the process of (I), the processor further executes the instructions to perform or support another device to perform processes of: (I01) if a request for registration of the specific user using the public key of the specific user is acquired, determining whether the specific user is valid and transmitting a specific random nonce to the specific user who is determined as valid, (I02) if a signature value of the specific random nonce generated by signing the specific random nonce with the private key of the specific user is acquired, (i) determining whether the signature value of the specific random nonce is valid by using the public key of the specific user, (ii) registering at least one user-registering transaction, including (1) the specific random nonce (2) the signature value of the specific random nonce and (3) the public key of the specific user, in the public blockchain network, and (iii) providing a user-registering private transaction ID representing location information of the user-registering transaction in the private blockchain network to the specific user, and (I03) if the anchoring condition is satisfied, registering a second representative function value or its processed value as a representative value in the public blockchain network, wherein the second representative function value is generated by using (i) a particular function value created by applying the specific function to the user-registering transaction and (ii) its at least one corresponding particular associated associated function value, and acquiring a user-registering public transaction ID representing location information of the second representative function value or its processed value in the public blockchain network.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which:

FIG. 3 is a drawing schematically illustrating a method of registering a currency issuer in accordance with one example embodiment of the present disclosure.

FIGS. 4 and 5 are drawings schematically illustrating a process of registering a transaction in a public blockchain network in accordance with one example embodiment of the present disclosure.

FIG. 6A is a drawing schematically illustrating a method for undelayed settling of a payment of the cryptocurrency in accordance with one example embodiment of the present disclosure.

DETAILED DESCRIPTION OF THE PREFERRED EMBODIMENTS

Figure 1:
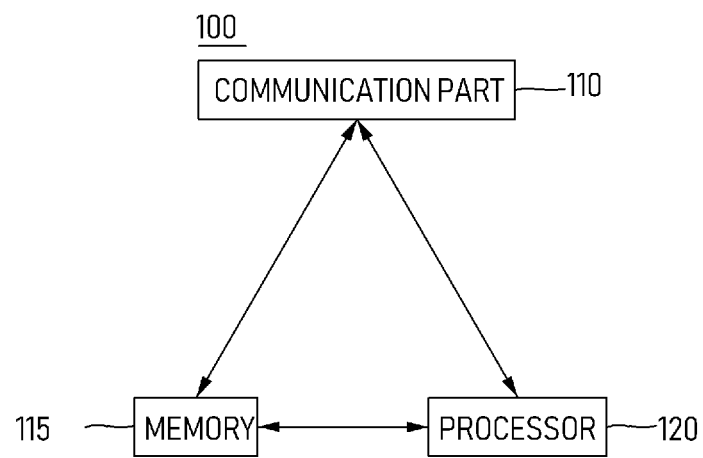
FIG. 1 is a drawing schematically illustrating a server for issuing a cryptocurrency in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Throughout the present disclosure, every processor, every memory, every storage, or any other computing components are described as separate components, however, said every processor, said every memory, said every storage, or said any other computing components may be configured as a single device or any other combinations thereof.

Also, a term "specific" is added to terms or concepts related to major subjects who is active in taking actions, a term "associated" is added to terms or concepts related to other subjects having close interrelation to be explained later to the major subjects and the terms of concepts with "associated" may mean those used for calculating representative function values, etc., but the scope of the present disclosure is not limited thereto, and its details will be explained later, and in descriptions below, the term "specific" and the term "associated" may be omitted, as either of the concepts is apparent from the context. However, the terms "specific" and "associated" are used in claims for clarification.

Further, a specific function used in the present disclosure may be a hashing function, and a function value, e.g., a header function value, may be a hash value generated by using the hashing function, but the scope of the present disclosure is not limited thereto.

For reference, in the description below, the phrase "for reference" is added for terms related to objects or concepts that are registered or stored in advance to be used as a reference, and the phrase "for comparison" is added for terms related to objects or concepts that are presented or requested to be compared with the reference, to avoid possible confusion.

Throughout the present disclosure, a term "currency" may mean cryptocurrency, but the scope of the present disclosure is not limited thereto.

FIG. 1 is a drawing schematically illustrating a server 100 issuing a cryptocurrency, and the server 100 may include a communication part 110, a memory 115 for storing instructions to issue the cryptocurrency and settle a payment of the cryptocurrency, and a processor 120 for performing processes to issue the cryptocurrency and settle the payment corresponding to the instructions in the memory 115, in accordance with one example embodiment of the present disclosure. Identical reference numerals are for convenience of explanation but not intended for representing sameness of separate devices. Further, as another example, the method may be performed by the server 100 or another server of a different configuration.

The server 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 110 of such devices may transmit requests to and receive responses from other linked devices. As one example, such requests and responses may be carried out by the same TCP session, but the scope of the present disclosure is not limited thereto. For example, they could be transmitted and received as UDP datagrams.

The processor 120 of such devices may include hardware configuration of MPU (Micro Processing Unit) or CPU (Central Processing Unit), cache memory, data bus, etc.

Additionally, any OS and software configuration of applications that achieve specific purposes may be further included.

Figure 2:
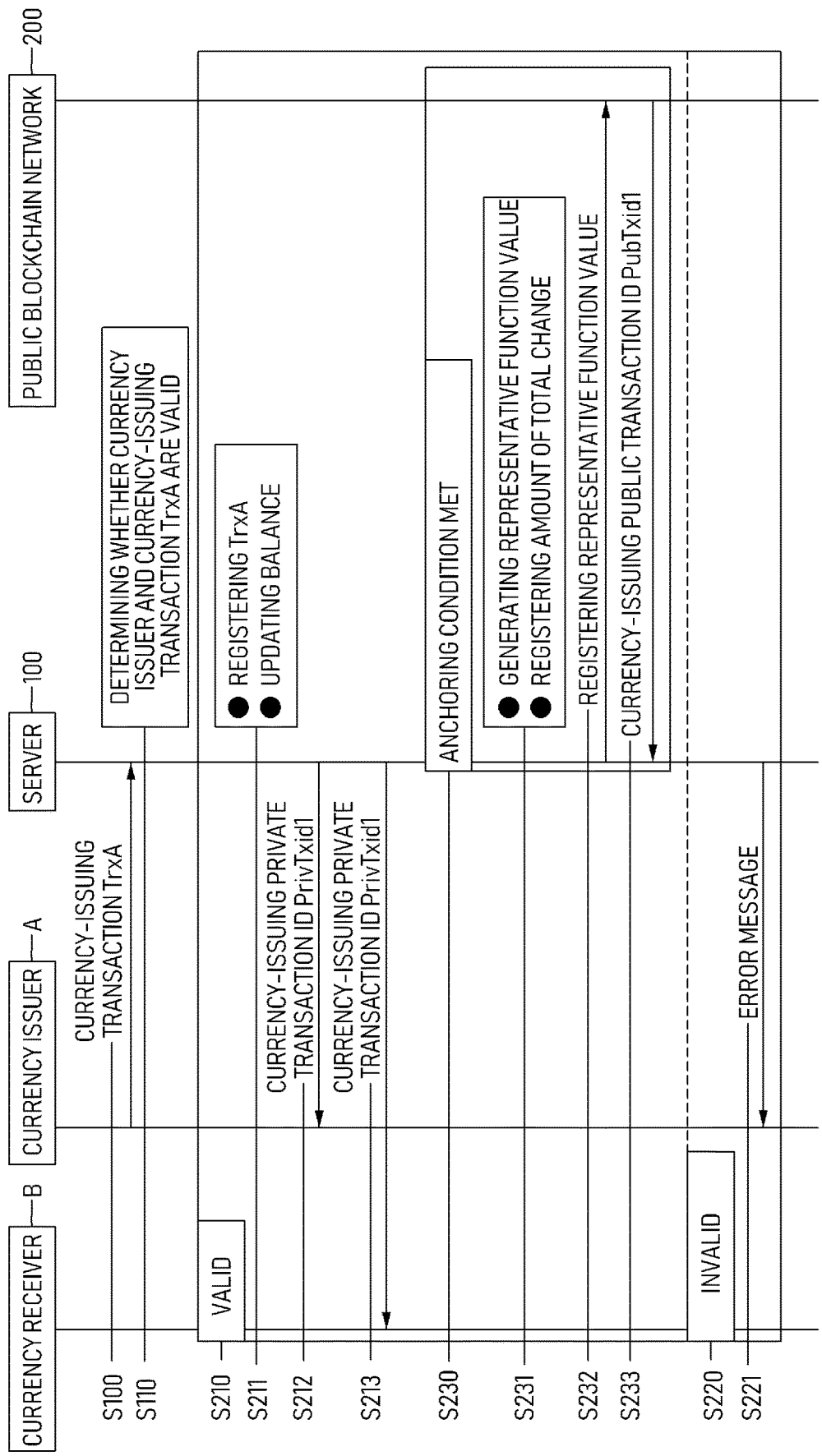
FIG. 2 is a drawing schematically illustrating a method for issuing the cryptocurrency in accordance with one example embodiment of the present disclosure.

First, a method for issuing a cryptocurrency in accordance with one example embodiment of the present disclosure is described using the server in FIG. 1, by referring to FIG. 2 as follows.

If a currency issuer A, including a central bank of a nation or a currency managing body of a group, generates and transmits at least one currency-issuing transaction TrxA for issuing the cryptocurrency by way of a terminal at a step of S100, the server 100 may acquire the currency-issuing transaction TrxA by way of the communication part 110.

Herein, the currency-issuing transaction TrxA may include (i) a specific unique nonce, (ii) a currency receiver who receives a specific amount of the cryptocurrency, (iii) an issued amount of the cryptocurrency, (iv) a public key of the currency issuer, and (v) a signature value of the currency issuer generated by signing (i), (ii), (iii), and (iv) with a private key of the currency issuer. Herein, the specific unique nonce may have a purpose of preventing a replay attack, and it may be an arbitrary number that can only be used once, which may be a time stamp, but the scope of the present disclosure is not limited thereto. In detail, because a single transaction has a single unique nonce, if the unique nonce included in a received transaction is found to have been used in another transaction received earlier, then the received transaction is determined as an anomalous transaction, i.e., an invalid transaction, thus the replay attack can be prevented.

Also, the currency receiver may include information on a receiver of the issued amount of the cryptocurrency, and may include a public key of a specific user registered as a currency user, and a public key of the currency receiver and the public key of the currency issuer may have been registered in the server 100 in advance or at an appropriate time as the need may be, and the registered information may include at least one public key of an issuer or a user who has a private key and a public key, which is registered in the server 100. Its details will be explained in other processes. Also, the currency issuer A may already have the public key of the currency receiver B as information on the currency receiver B.

As one example, the currency-issuing transaction TrxA may have a data format of 1. a payment-settling mode of a payment, 2. the specific unique nonce, 3. the currency receiver, 4. the issued amount, 5. the public key of the currency issuer, and 6. the signature value of the currency issuer, but the scope of the present disclosure is not limited thereto.

Herein, "1. the payment-settling mode of the payment" may include an undelayed payment and a delayed payment as its way of settling the payment, and the undelayed payment may process a currency-related transaction without delay, and the delayed payment may delay processing the currency-related transaction until a certain condition is satisfied. As one example, the delayed payment may allow setting-off between received amount and amount of a payment larger than a total balance, for resolving a liquidity problem when the amount for the payment is lacking. However, since the currency issuer is an institution or a body that generates additional amount of the currency, the delayed payment does not occur when issuing the currency, therefore the undelayed payment may be set as default, or the format of the data on the payment-settling mode may not be included in the currency-issuing transaction. And "2. the specific unique nonce" may be a disposable number that can only be used once to prevent the replay attack. Also, "3. the currency receiver" may be the public key PubB of the currency receiver who is to receive the issued amount of the cryptocurrency, "4. the issued amount" may be an amount of the cryptocurrency to be issued, "5. the public key of the currency issuer" may be the public key PubA registered by the currency issuer, and "6. the signature value of the currency issuer" may be a signature value SignPrivA(1, 2, 3, 4, 5) generated by signing 1, 2, 3, 4, and 5 with the private key of the currency issuer.

Then, the processor 120 of the server 100 may determine whether the currency issuer and the currency-issuing transaction TrxA are valid at a step of S110, where the currency-issuing transaction includes (i) the specific unique nonce, (ii) the currency receiver who receives the specific amount of the cryptocurrency, (iii) the issued amount of the cryptocurrency, (iv) the public key of the currency issuer, and (v) the signature value of the currency issuer. Herein, the processor 120 of the server 100 may confirm or support another device to confirm a validity of the data format of the currency-issuing transaction TrxA, a validity of the currency receiver, a validity of the public key of the currency issuer, and a validity of the signature value of the currency issuer, to thereby determine whether the currency-issuing transaction TrxA is valid. As one example, the processor 120 may confirm whether each of the public keys of the currency receiver and the currency issuer acquired by using the public key of the currency issuer on the signature value of the currency issuer A is identical to each of those in the currency-issuing transaction TrxA, to thereby determine whether the public keys of the currency receiver and the currency issuer are valid. Also, by verifying the signature value of the currency issuer using the public key of the currency issuer, the processor 120 may determine whether the currency issuer and the signature value of the currency issuer are valid. Also, the currency-issuing transaction TrxA may be validated by confirming the specific unique nonce.

And, as a result of confirming whether the currency-issuing transaction TrxA is valid at a step of S110, if the currency-issuing transaction TrxA is determined as valid at a step of S210, the server 100 may update or support another device to update a balance database by referring to an amount of a balance change caused by the issued amount included in the currency-issuing transaction TrxA at a step of S211. In other words, a previous balance BDBprev of the balance database may be updated to a current balance BDBnow as BDBnow=BDBprev+deltaA, i.e., a sum of the previous balance BDBprev of the cryptocurrency-related transactions registered in the balance database and an amount of a balance change deltaA, where deltaA is acquired by referring to the issued amount in the currency-issuing transaction TrxA. Herein, because the previous balance at the time of issuing the cryptocurrency is zero or non-existent, the updated balance of the balance database may be the issued amount of the cryptocurrency in the currency-issuing transaction TrxA. Herein, for convenience, the deltaA is described as the amount of the balance change of a single transaction by a single issuer, however, may include amount of changes of multiple transactions.

Also, as a result of confirmation, if the currency-issuing transaction is determined as valid, the server 100 may perform or support another device to perform processes of registering the currency-issuing transaction TrxA including (i) the specific unique nonce, (ii) the currency receiver, (iii) the issued amount of the cryptocurrency, (iv) the public key of the currency issuer, and (v) the signature value of the currency issuer in the private blockchain network at a step of S211, and providing a currency-issuing private transaction ID PrivTxid1 representing location information of the currency-issuing transaction TrxA in the private blockchain network to at least part of the currency issuer A and the currency receiver B at steps of S212 and S213. However, if the currency-issuing transaction is determined as invalid at a step of S220, the server 100 may notify or support another device to notify the currency issuer A of a fact that a registration failed through an error message, at a step of S221.

And, if the currency-issuing transaction is determined as valid and if an anchoring condition for registering function values in the public blockchain network is satisfied at a step of S230, the server 100 may perform or support another device to perform processes of registering an amount of a total change delta_n in balances of the balance database changed by all transactions related to the cryptocurrency in an n-th block of the private blockchain network, and generating a representative function value or its processed value calculated by using a specific function value and its at least one corresponding specific associated function value at a step of S231, where the specific function value is generated by applying a specific function to the currency-issuing transaction including (i) the specific unique nonce, (ii) the currency receiver, (iii) the issued amount of the cryptocurrency, (iv) the public key of the currency issuer, and (v) the signature value of the currency issuer. Herein, said at least one corresponding specific associated function value may be generated by applying the specific function to one of (i) information on the amount of the total change in the balances of the balance database changed by all the transactions related to the cryptocurrency within the n-th block in the private blockchain network and (ii) information on each of the balances of the balance database.

Also, the server 100 may perform or support another device to perform processes of (i) registering the representative function value or its processed value in the public blockchain network 200 as a representative value at a step of S232, and (ii) acquiring a currency-issuing public transaction ID PubTxid1 which represents location information of the representative function value or its processed value in the public blockchain network 200 at a step of S233. Herein, the server 100 may retrieve an OP message corresponding to the currency-issuing public transaction ID PubTxid1 from the public blockchain network 200.

The calculation by using the specific function value and at least one of the associated function values may be performed by various specific functions which may include an MD4 function, an MD5 function, an SHA-0 function, an SHA-1 function, an SHA-224 function, an SHA-256 function, an SHA-384 function, an SHA-512 function and a HAS-160 function, but the scope of the present disclosure is not limited thereto, as known to those skilled in the art. For example, a Triple SHA256 function may also be included.

Herein, the server 100 may store and manage the specific function value and the at least one associated function value in a certain data structure. Herein, the data structure may vary and one example may be a specific tree of a specific type, e.g., a Merkle tree or a Patricia tree, but the scope of the present disclosure is not limited thereto.

For example, the server 100 may create the Merkle tree whose specific leaf node has a specific function value, i.e., a specific hash value, and if the anchoring condition is satisfied, the server 100 may register in the public blockchain network 200 the representative function value, i.e., a representative hash value, or its processed value, where the representative hash value is calculated by using the specific function value, i.e., a specific hash value, and at least one hash value of at least one neighboring node which corresponds to the specific leaf node of the specific hash value.

More specifically, (x1) the server 100 may calculate an intermediate value by using (i) the specific hash value and (ii) a function value, i.e., a hash value, allocated to a sibling node of the specific leaf node where the specific hash value is allocated, and may allocate a hash value of the intermediate value to a parent node of the specific leaf node. (x2) If the parent node is a representative node, i.e., a root node, of the Merkle tree, the hash value allocated to the parent node becomes the representative hash value. (x3) On the contrary, if the parent node is not the root node, the server 100 may repeat the process from (x1) to (x3) by regarding the hash value allocated to the parent node as the specific hash value and regarding the parent node as the specific leaf node.

The server 100 may register or support another device to register the hash value allocated to the root node as the representative hash value in the public blockchain network 200. Herein, the processed value of the representative hash value may be registered. For example, a value resulting from hex operation on the representative hash value may be registered.

On the other hand, if the server 100 stores the specific hash value and the at least one associated hash value in a first data structure and then stores and manages a second data structure identical in a form to the first data structure, the first data structure and the second data structure may be connected in a form of a chain.

Especially, as aforementioned, if the first data structure and the second data structure are Merkle trees, a representative value, i.e., a root value, of the first data structure or a hash value of the root value may be allocated to a first leaf node of the second data structure.

Moreover, data integrity may be further ensured by verifying the first data structure when the second data structure is created. The verification of the second data structure will be explained later.

Further, in case of a first Merkle tree among at least two Merkle trees connected in a form of a chain, a hash value of a certain message data comprised of text, numbers or symbols, or a processed value of the hash value may be allocated to a first leaf node of the first Merkle tree. For example, at the time of creation of the Merkle tree, a hash value of a first input message given by the server 100 may be allocated.

FIGS. 4 and 5 are drawings illustrating examples of Merkle trees created in accordance with one example embodiment of the present disclosure.

FIG. 4 illustrates a Merkle tree with four leaf nodes. As the illustrated Merkle tree is a first Merkle tree whose tree_id is zero, a hash value sha256 (coinplug_unique_message) of a certain message data is allocated to an h0 node which is a first leaf node. If a request for registration of a transaction is made, the server 100 may create a leaf node next to a last leaf node of the Merkle tree currently configured and may allocate the specific hash value or its processed value to the created leaf node. For example, if an allocation of values is completed with an h1 node as a last which is a second leaf node of the Merkle tree in FIG. 4, and if a new leaf node is to be created, then an h2 node which is a next leaf node may be created and the specific hash value or its processed value sha256 (input2) may be allocated to the h2 node. Further, the server 100 may calculate by using (i) a specific hash value allocated to the h2 node and (ii) a hash value allocated to an h3 node which is a sibling node of the h2 node. The hash value of the calculated value may be allocated to an h23 node which is a parent node of the h2 node and the h3 node. Because the parent node, i.e., the h23 node, is not the root node of the Merkle tree, the server 100 may repeat the processes by regarding the hash value allocated to the h23 node as the specific hash value. In other words, with the hash value allocated to the h23 node as the specific hash value, the hash values allocated to the h23 node and an h01 node may be used together for calculation and allocated to an h0123 node which is a parent node of the h23 node and the h01 node. Herein, because the h0123 node is the root node, the server 100 may register the processed value (hex (h{node_index})) of the hash value allocated to the h0123 node in the public blockchain network 200. Meanwhile, the h3 node, which is a last leaf node in its block, may include a hash value of the amount of the total change delta_n of the balance database.

Meanwhile, the anchoring conditions may include at least one of (i) a condition that a certain number of the transactions related to the cryptocurrency are generated, (ii) a condition that a certain amount of time is elapsed, (iii) a condition that a block is created in the private blockchain network, and (iv) a condition about at least one of characteristics of services. Herein, the transactions related to the cryptocurrency may include registering the currency issuer, settling the payment of part of the cryptocurrency, registering the users, etc. in addition to issuing part of the cryptocurrency.

On the other hand, for example, if the multiple transactions, whose number equals the number of leaf nodes in a Merkle tree to be created, related to the cryptocurrency are acquired, then the server 100 may perform or support another device to perform processes of creating the Merkle tree and registering a representative value, or a root value, i.e., a Merkle root, of the Merkle tree in the public blockchain network 200.

Also, the server 100 may create a root value of the Merkle tree aforementioned at stated intervals, by referring to the condition (ii) above. In this case, the server 100, if the certain amount of time is elapsed, may perform or support another device to perform processes of creating a Merkle tree by referring to the multiple transactions related to the cryptocurrency by that time, and registering the root value of the Merkle tree in the public blockchain network 200.

However, in this case, no value may be allocated to a sibling node of the node to which the specific hash value is allocated even though the certain amount of time is elapsed. As such, in case no hash value is allocated to the sibling node even though the anchoring condition is met, the server 100 may allocate a certain hash value to the sibling node, to thereby produce a root value of the Merkle tree by the method aforementioned. For example, the server 100 may perform or support another device to perform processes of copying and allocating the specific hash value to the sibling node.

Further, the server 100 may perform or support another device to perform processes of storing a header function value, i.e., a header hash value, in a block header of an n-th block when the n-th block is created, as the above condition (iii), in the private blockchain network, where the header hash value is a hash value calculated by using information on the balances of the balance database or information on the total change of the balances.

As one example, on condition that (i) a currency-issuer representative hash value has been generated by using a first Merkle tree whose leaf nodes include hash values calculated from at least one random nonce, at least one signature value of the random nonce, and at least one public key of the currency issuer, (ii) a currency-trading representative hash value has been generated by using a second Merkle tree whose leaf nodes include hash values calculated from all the transactions related to issue and use of the cryptocurrency, and that (iii) the currency-issuer representative hash value and the currency-trading representative hash value have been further registered in the block header of the n-th block, the server 100 may register or support another device to register the header hash value, the currency-issuer representative hash value and the currency-trading representative hash value or their processed values in the public blockchain network 200.

Also, on condition that (i) a private representative hash value has been generated from a Merkle tree whose leaf nodes include (i-1) at least one hash value calculated from the random nonce, the signature value of the random nonce and the public key of the currency issuer, and (i-2) at least one hash value calculated from all the transactions related to the issue and use of the cryptocurrency, and that (ii) the private representative hash value has been further registered in the block header of the n-th block, the server 100 may register or support another device to register the header hash value and the private representative hash value or their processed values in the public blockchain network 200.

And the characteristics of the services may be at least part of (i) information on a cost paid by the currency issuer who requested issuing of the issued amount of the cryptocurrency, (ii) information on a time-zone during which registrations of the currency-issuing transactions are performed, (iii) information on a location where registration service of the currency-issuing transactions is provided, and (iv) information on a type of a company that requested the registrations of the currency-issuing transactions. However, the scope of the present disclosure is not limited thereto.

Meanwhile, if a creation of a new Merkle tree starts and if the anchoring condition is satisfied without the currency-issuing transaction, the server 100 may perform or support another device to perform processes of creating the new Merkle tree by allotting certain message data to its first and second leaf nodes and registering the root value of the new Merkle tree or its processed value in the public blockchain network 200. In this case, the new Merkle tree with two leaf nodes may be created.

On the other hand, as aforementioned, if the server 100 stores the specific hash value and the at least one neighboring hash value in a first data structure and then stores and manages a second data structure identical in a form to the first data structure, the first data structure and the second data structure may be connected in a form of a chain. Especially, if the first data structure and the second data structure are Merkle trees, a root value of the first data structure or a hash value of the root value may be allocated to a first leaf node of the second data structure.

FIG. 5 is a drawing schematically illustrating an example of a Merkle tree created in a form of the second data structure in accordance with one example embodiment of the present disclosure.

By referring to FIG. 5, it is clear that the root value hex(h0123) of the Merkle tree whose tree_id is zero in FIG. 4 is allocated as sha256 (input4) to the first leaf node which is an h4 node of a new Merkle tree. In such a manner, the present disclosure has advantage of improving data integrity, as tracking becomes easier even in the case of data forgery, by connecting multiple data structures created when a transaction occurs.

Next, by referring to FIG. 3, a process of registering the currency issuer A is described as follows.

If a request for registration of the currency issuer using the public key PubA thereof is acquired at a step of S300, the server 100 may perform or support another device to perform processes of determining whether the currency issuer A is valid, and if the currency issuer A is determined as valid at a step of S310, transmitting a random nonce RN for reference to the currency issuer A at a step of S311. If the currency issuer A is determined as invalid at a step of S320, for example, if the currency issuer is an illegal issuer, the server 100 may notify or support another device to notify the currency issuer A of a fact that a confirmation of the currency issuer failed, at a step of S321.

In detail, on condition that the currency issuer A has created the private key PrivA and the public key PubA using a user device, if the public key PubA is transmitted to the server 100 for registering the currency issuer as an issuer of the issued amount of the cryptocurrency, the server 100 may determine whether the currency issuer A of the acquired public key is valid. Herein, a Public Key Infrastructure (PKI) based certificate, or identification information on the currency issuer A may be used to determine whether the currency issuer A is valid, but the scope of the present disclosure is not limited thereto. As one example, the currency issuer may be confirmed by a public key certificate based on the PKI, an OPSign certificate, or the identification information that can confirm an identity of a person, a bank, a group, or an organization, like an SSN, a passport, the Employer Identification Number, Corporation Registration Number, Business Registration Number, etc.

Thereafter, if a signature value SignPrivA(RN) of the random nonce generated by signing the random nonce RN for reference with the private key of the currency issuer A is acquired at a step of S312, the server 100 may determine whether the signature value SignPrivA(RN) of the random nonce is valid by using the public key of the currency issuer A. That is, the server 100 may extract a random nonce RN for comparison from the signature value SignPrivA(RN) of the random nonce by using the public key of the currency issuer, and may compare the extracted random nonce for comparison and the random nonce for reference transmitted to the currency issuer, to thereby determine the signature value SignPrivA(RN) as valid if the random nonce for comparison and the random nonce for reference are identical. However, a way of determining whether the currency issuer A is valid is not limited thereto, for example, a time stamp may be used to determine whether the currency issuer A is valid. For reference, in the present specification, the random nonce is used as an example to determine whether the currency issuer is valid.

And, if the signature value acquired from the currency issuer A is determined as valid at a step of S330, the server 100 may perform or support another device to perform processes of registering an issuer-registering transaction, i.e., transaction(RN, SignPrivA(RN), PubA) including the random nonce for comparison, the signature value of the random nonce for comparison, and the public key of the currency issuer, in the private blockchain network at a step of S331, and notifying the currency issuer A of a fact that a registration including an issuer-registering private transaction ID PrivTxid2 which represents location information of the issuer-registering transaction in the private blockchain network is successful, at a step of S332.

However, if the signature value acquired from the currency issuer A is determined as invalid at a step of S340, the server 100 may notify or support another device to notify the currency issuer A of a fact that a confirmation of the signature value failed, at a step of S341.

Also, if the signature value of the currency issuer is determined as valid and if the anchoring condition, e.g., a condition for registering a function value in the public blockchain network 200, is satisfied at a step of S350, the server 100 may perform or support another device to perform processes of (i) generating a representative function value or its processed value calculated by using (i-1) a specific function value function (RN, SignPrivA(RN), PubA) which is created by applying the specific function to the issuer-registering transaction including the random nonce, the signature value of the random nonce, and the public key of the currency issuer, and (i-2) its corresponding at least one associated function value, at a step of S351, (ii) registering the representative function value or its processed value in the public blockchain network 200 at a step of S352, and (iii) acquiring an issuer-registering public transaction ID PubTxid2 which represents location information of the created representative function value or its processed value in the public blockchain network 200 at a step of S353. Herein, the representative function value or its processed value may be generated by using the specific tree as in FIG. 4. Also, the server 100 may retrieve an OP message corresponding to the issuer-registering public transaction ID PubTxid2 from the public blockchain network 200.

Figure 6B:
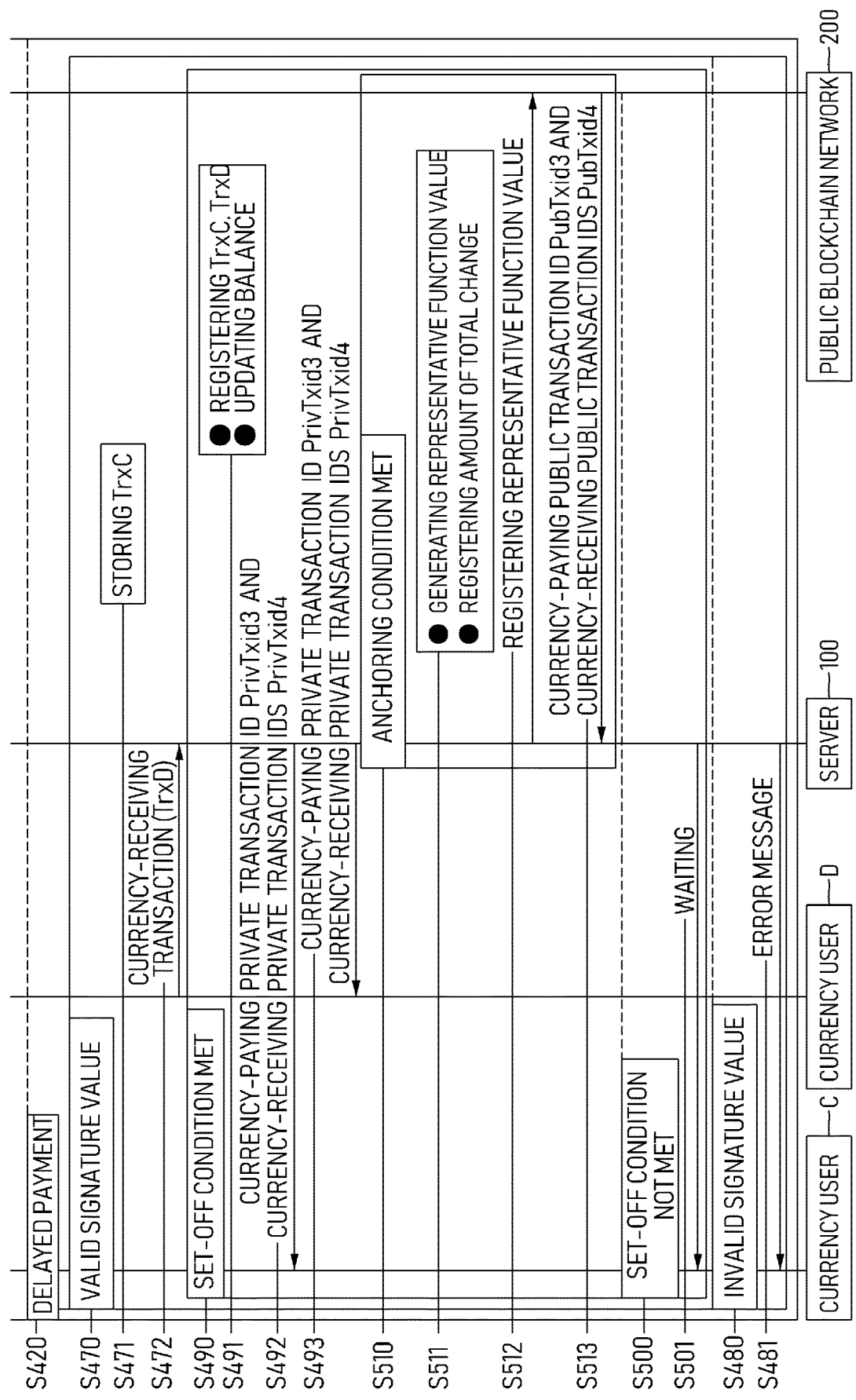
FIG. 6B is a drawing schematically illustrating a method for delayed settling of the payment of the cryptocurrency in accordance with one example embodiment of the present disclosure.

Next, by referring to FIGS. 6A and 6B, a method for settling the payment of the cryptocurrency in accordance with one example embodiment of the present disclosure is described as follows. A part of the following description similar to the method of issuing the cryptocurrency in accordance with one example embodiment of the present disclosure in FIG. 2 is omitted, as it is easily inferred from FIG. 2.

For settling the payment of the cryptocurrency, if at least one currency-paying transaction TrxC for settling the payment of the currency by a specific user C is transmitted from the user device of the specific user C, the server 100 may acquire the currency-paying transaction TrxC by way of the communication part 110 at a step of S400.

Herein, the currency-paying transaction TrxC may include (i) the specific unique nonce, (ii) the information on the currency receiver who receives the specific amount of the cryptocurrency, (iii) the specific amount of settling the payment of the cryptocurrency, (iv) a public key of the specific user C, and (v) a signature value of the specific user C generated by signing the specific unique nonce, the information on the currency receiver, the specific amount, and the public key of the specific user C with a private key of the specific user C. Herein, the specific unique nonce may have a purpose of preventing a replay attack, and it may be an arbitrary number that can only be used once, which may be a time stamp, but the scope of the present disclosure is not limited thereto. In detail, because a single transaction has a single unique nonce, if the unique nonce included in a received transaction is found to have been used in another transaction received earlier, then the received transaction is determined as an anomalous transaction, i.e., an invalid transaction, thus the replay attack can be prevented.

Also, the information on the currency receiver may be the public key of the currency receiver, who receives the specific amount of the cryptocurrency being settled, among users registered as currency users, and the public key of the currency receiver and the public key of the specific user C may have been registered in the server 100 in advance or at an appropriate time as the need may be, and the registered information may include at least one public key of an issuer or a user who has a private key and a public key, which is recorded in the server 100. Its details will be explained in other processes. Also, the specific user C may already have the public key of the currency receiver as information on the currency receiver.

And, as one example, the currency-paying transaction TrxC may have a data format of 1. a payment-settling mode of a payment, 2. the specific unique nonce, 3. the currency receiver, 4. an amount of the payment, 5. the public key of the specific user, and 6. the signature value of the specific user.

Herein, "1. the payment-settling mode" may include an undelayed payment and a delayed payment as its payment-settling mode of the payment, and the undelayed payment may process a transaction related to the payment without delay and the delayed payment may delay processing the transaction related to the payment until a certain condition is satisfied. As one example, the delayed payment may allow setting-off between received amount and amount of a payment larger than a total balance, for resolving a liquidity problem when the amount for the payment is lacking. And "2. the specific unique nonce" may be a disposable number that can only be used once to prevent the replay attack. Also, "3. the currency receiver" may be the public key PubB of the currency receiver of the amount to be settled of the cryptocurrency, "4. the amount of the payment" may be the amount to be settled of the cryptocurrency, "5. the public key of the specific user" may be the public key of the specific user C who is about to settle the payment, and "6. the signature value of the specific user" may be a signature value SignPrivC(1, 2, 3, 4, 5) generated by signing 1, 2, 3, 4, and 5 with the private key of the specific user C.

Then, the server 100 may determine by which payment-settling mode the payment in the currency-using transaction will be settled, by referring to the total balance of the specific user C. Herein, if the total balance owned by the specific user C is equal to or greater than the amount for settling the payment, then the undelayed payment may be selected, and if the total balance owned by the specific user C is less than the amount for settling the payment, then the delayed payment may be selected. Also, the undelayed payment and the delayed payment may be determined according to how the payment included in the currency-using transaction will be settled, and even in case the currency-using transaction indicates the undelayed payment, if the total balance owned by the specific user C is less than the amount of the payment, the delayed payment may be selected.

Herein, if the currency-using transaction TrxC is determined as indicating the undelayed payment at a step of S410, the server 100 may determine whether the signature value of the specific user C in the currency-using transaction TrxC is valid and if it is determined as valid at a step of S430, the server 100 may update or support another device to update the balance database by referring to an amount of a balance change caused by the amount of the payment of the cryptocurrency included in the currency-issuing transaction TrxC at a step of S431. In other words, a previous balance BDBprev of the balance database may be updated to a current balance BDBnow as BDBnow=BDBprev+deltaC, i.e., a sum of the previous balance BDBprev of the cryptocurrency-related transactions registered in the balance database and an amount of a balance change deltaC, where deltaC is acquired by referring to the amount of the payment in the currency-paying transaction.

Also, if the signature value of the specific user C is determined as valid, the server 100 may perform or support another device to perform processes of registering the currency-paying transaction TrxC in the private blockchain network at a step of S431, and providing a currency-paying private transaction ID PrivTxid3 representing location information of the currency-paying transaction TrxC in the private blockchain network to at least part of the specific user C and the currency receiver at a step of S432. However, if the signature value of the specific user C is determined as invalid at a step of S440, the server 100 may notify or support another device to notify the specific user C of a fact that a registration failed through an error message, at a step of S441.

Also, if the signature value of the specific user C is determined as valid and if the anchoring condition is satisfied at a step of S450, the server 100 may register the amount of the total change delta_n in the balances of the balance database changed by all the transactions related to the cryptocurrency in the n-th block of the private blockchain network, and generating a representative function value or its processed value, as a representative value, calculated by using a specific function value function (TrxC) and its at least one corresponding specific associated function value at a step of S451, where the specific function value is generated by applying the specific function to the currency-paying transaction TrxC. And, the server 100 may perform or support another device to perform processes of (i) registering the representative function value or its processed value in the public blockchain network 200 as the representative value at a step of S452, and (ii) acquiring a currency-paying public transaction ID PubTxid3 which represents location information of the representative function value or its processed value in the public blockchain network 200 at a step of S453. Herein, the representative function value or its processed value may be generated by using the Merkle tree as in FIGS. 4 and 5. Also, the server 100 may retrieve an OP message corresponding to the currency-paying public transaction ID PubTxid3 from the public blockchain network 200.

On the other hand, if the currency-paying transaction TrxC is determined as indicating the delayed payment at a step of S420, the server 100 may determine whether the signature value of the specific user C in the currency-paying transaction TrxC is valid and if it is determined as valid at a step of S470, may register the currency-paying transaction TrxC in a netting database, i.e., a recording device like a storage part, a memory, etc., at a step of S471. However, if the signature value of the specific user C is determined as invalid at a step of S480, the server 100 may notify or support another device to notify the specific user C of a fact that a registration failed through an error message, at a step of S481.

Then, on condition that the currency-paying transaction TrxC has been registered in a storage, if at least one currency-receiving transaction TrxD, in which at least one of other users D is to settle the amount of the payment and the specific user C is a receiver of the payment, is acquired at a step of S472, the server 100 may confirm whether the currency-receiving transaction TrxD and the currency-paying transaction TrxC satisfy at least one of set-off conditions. Herein, the currency-receiving transaction TrxD may be a currency-paying transaction stored as indicating the delayed payment and including the specific user C as its receiver, in which case the server 100 may perform a set-off of the currency-paying transaction TrxC in response to a set-off of the currency-receiving transaction TrxD stored as indicating the delayed payment. Also, the server 100 may determine whether one of the set-off conditions is satisfied, which is a condition that the total balance of the specific user C is equal to or greater than the amount of the payment by the set-off to be performed in response to the currency-receiving transaction TrxD.

Meanwhile, if none of the set-off conditions is satisfied by the acquired currency-receiving transaction TrxD at a step of S500, the server 100 may store the acquired currency-receiving transaction TrxD and may wait for acquisition of another currency-receiving transaction at a step of S501.

If one of the set-off conditions is satisfied by one or more currency-receiving transactions TrxD at a step of S490, that is, if a total amount receivable by the multiple currency-receiving transactions TrxD exceeds an amount to pay for by the currency-paying transaction TrxC, or if a sum of the total amount receivable by the multiple currency-receiving transactions TrxD and the total balance of the specific user C exceeds the amount to pay for by the currency-paying transaction TrxC, then the server 100 may perform a set-off between the currency-paying transaction TrxC and the multiple currency-receiving transactions TrxD. Herein, the multiple currency-receiving transactions TrxD may be (i) multiple currency-receiving transactions created by another specific user, (ii) multiple currency-receiving transactions created by other multiple users, or (iii) multiple currency-receiving transactions created by each of said other multiple users.

Also, if the specific user C and said other multiple users are connected in a closed loop topology as users/payers and receivers of the currency-paying transactions of the delayed payment, the server 100 may perform a set-off between every currency-paying transaction of the delayed payment connected in the closed loop topology. Apparently, in case certain one or more currency-paying transactions of the delayed payment satisfy none of the set-off conditions due to differences in the amounts of the payments of other currency-paying transactions, if said certain one or more currency-paying transactions satisfy one of the set-off conditions due to another currency-paying transaction, the server 100 may perform a set-off between every currency-paying transaction of the delayed payment connected in a circle.

As one example of users connected in the closed loop topology, if a user A creates a currency-paying transaction A of the delayed payment with a user B, the user B creates a currency-paying transaction B of the delayed payment with a user C, the user C creates a currency-paying transaction C of the delayed payment with a user D, the user D creates a currency-paying transaction D of the delayed payment with the user A, thus a cyclic relation among the users A, B, C, and D with each of them as a payer and receiver to each other is created, then the server 100 may perform a set-off among the currency-paying transactions A, B, C, and D created by the users A, B, C, and D. Clearly, each of the amounts of the payments of each of the currency-paying transactions of the delayed payment must coincide, but if it does not, if each of the currency-paying transactions of the delayed payment satisfies one of the set-off conditions, a set-off may be performed, where each of the currency-paying transactions of the delayed payment satisfies one of the set-off conditions with a next currency-paying transaction in turn thus forming a cyclic relation.

And, the server 100 may update or support another device to update the balance database by referring to (i) an amount of the balance change deltaC caused by the amount of the payment included in the currency-paying transactions TrxC and (ii) an amount of the balance change deltaD caused by the amount of the payment included in the currency-receiving transaction TrxD, at a step of S491. That is, the previous balance BDBprev of the balance database may be updated to the current balance BDBnow as BDBnow=BDBprev+deltaC+deltaD, i.e., a sum of the previous balance BDBprev of the cryptocurrency-related transactions registered in the balance database, an amount of the balance change deltaC acquired by referring to the amount of the payment in the currency-paying transaction, and an amount of the balance change deltaD acquired by referring to the amount of the payment in the currency-receiving transaction.

Also, the server 100 may perform or support another device to perform processes of registering the set-off currency-paying transaction TrxC and the set-off multiple currency-receiving transactions TrxD in the private blockchain network at a step of S491, and providing the currency-paying private transaction ID PrivTxid3 and multiple currency-receiving private transaction IDs PrivTxid4 respectively representing each piece of location information of the currency-paying transaction TrxC and the multiple currency-receiving transactions TrxD in the private blockchain network to at least part of (i) the specific user C, (ii) the currency receiver, and (iii) multiple other users D at steps of S492 and S493. Herein, information stored, that is, the currency-paying transaction TrxC and the acquired multiple currency-receiving transactions TrxD may be deleted.

And, in response to the set-off between the currency-paying transaction TrxC and the multiple currency-receiving transactions TrxD, if the anchoring condition is determined as satisfied at a step of S510, the server 100 may register the amount of the total change delta_n in the balances of the balance database changed by all the transactions related to the cryptocurrency included in the n-th block of the private blockchain network at a step of S511.

Herein, the amount of the total change delta_n may represent amounts of all changes of the cryptocurrency within the n-th block, and the amount of the total change delta_n may correspond to a difference between a state of the balance database at a time of completion of the n-th block and a state of the balance database at a time of completion of an (n-1)-th block of the private blockchain network, and each state of the balance database may be identified by each of private transaction IDs representing each piece of location information corresponding to all the transactions registered in the n-th block. Also, the balance database may include (i) specific balance information on the specific currency-issuing transaction and (ii) at least one piece of associated balance information on at least one associated transaction among all the transactions.

Meanwhile, the server 100 may perform or support another device to perform processes of generating a representative function value or its processed value, as a representative value, at a step of S511 which is calculated by using (i) a specific function value created by applying the specific function to the set-off currency-paying transaction TrxC, and (ii) its corresponding at least one associated function value, and registering the representative function value or its processed value in the public blockchain network 200 at a step of S512. Also, the server 100 may perform or support another device to perform processes of generating a representative function value or its processed value, as a representative value, at the step of S511 which is calculated by using (i) a specific function value created by applying the specific function to said one or more set-off currency-receiving transactions TrxD, and (ii) its corresponding at least one associated function value, and registering the representative function value or its processed value in the public blockchain network 200 at the step of S512. That is, the server 100 may register or support another device to register information on the set-off currency-paying transaction and on every set-off currency-receiving transaction in the public blockchain network 200.

And, the server 100 may acquire or support another device to acquire the currency-paying public transaction ID PubTxid3 and one or more currency-receiving public transaction IDs PubTxid4 respectively representing location information of the representative value corresponding to the currency-paying transaction and the representative value corresponding to the currency-receiving transactions in the public blockchain network 200 at a step of S513. Herein, the representative function value or its processed value may be generated by using the Merkle tree as in FIGS. 4 and 5. And, the server 100 may retrieve each OP message corresponding to the currency-paying public transaction ID PubTxid3 and to the multiple currency-receiving public transaction IDs PubTxid4 from the public blockchain network 200.

Next, a process of the server 100 registering the specific user who uses the cryptocurrency is described as follows. The registration process of the specific user is similar to the registration process of the currency issuer as in FIG. 5, and thus the explanation is omitted.

If a request for registration of the specific user C using the public key thereof is acquired, the server 100 may determine whether the specific user C is valid, and may transmit or support another device to transmit a random nonce to the specific user C if the specific user C is determined as valid. If the specific user C is determined as invalid, the server 100 may notify or support another device to notify the specific user C of a fact that a confirmation of the specific user failed.

On the other hand, in case the specific user C is determined as valid, if the signature value of the random nonce generated by signing the random nonce with the private key of the specific user is acquired, the server 100 may determine whether the signature value of the random nonce is valid, by applying the public key of the specific user to the signature value.

Further, if the signature value acquired from the specific user C is determined as valid, the server 100 may perform or support another device to perform processes of registering a user-registering transaction of the specific user including the random nonce, the signature value of the random nonce, and the public key of the specific user, in the private blockchain network, and providing a user-registering private transaction ID PrivTxid5 representing location information of the user-registering transaction in the private blockchain network to the specific user C.

However, if the signature value acquired from the specific user C is determined as invalid, the server 100 may notify or support another device to notify the specific user C of a fact that a confirmation of the signature value failed.

Also, if the signature value of the specific user C is determined as valid and if the anchoring condition is satisfied, the server 100 may perform or support another device to perform processes of (i) generating a representative function value or its processed value calculated by using a certain function value and its corresponding at least one associated function value, (ii) registering the representative function value or its processed value in the public blockchain network 200, and (iii) acquiring a user-registering public transaction ID PubTxid5 which represents location information of the representative function value or its processed value in the public blockchain network 200, where the certain function value is generated by applying the specific function to the user-registering transaction including (i) the random nonce, (ii) the signature value of the random nonce, and (iii) the public key of the specific user. Herein, the representative function value or its processed value may be generated by using the Merkle tree as in FIGS. 4 and 5.

Meanwhile, the currency receiver B, the currency user C, and the currency user D may be the banking institutions or a person.

The present disclosure has an effect of improving reliability and security of the information on the issuance of the currency and on settling the payment by recording the information on the issuance of the currency and on settling the payment in the blockchain to prevent forgery or illegal copying.

The present disclosure has another effect of improving reliability and security of the information on the issuance of the currency and on settling the payment by using specific functions and a cryptography to prevent forgery and illegal copying.

The present disclosure has still another effect of preventing duplicate payments of the currency by recording the information on the issuance of the currency and on settling the payment in the the blockchain.

The present disclosure has still yet another effect of improving convenience of users by maintaining up-to-date settlement information without a settling procedure between the central bank and the banking institutions in a private sector.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for issuing a cryptocurrency, comprising steps of:
 (a) acquiring, by a server, a specific currency-issuing transaction comprising (i) a specific unique nonce, (ii) a currency receiver ID to receive a specific amount of the cryptocurrency, (iii) an issued amount of the cryptocurrency, (iv) a public key of a currency issuer, and (v) a signature value of the currency issuer generated by signing (i), (ii), (iii), and (iv) with a private key of the currency issuer;

determining, by the server, that the specific currency-issuing transaction and the currency issuer are valid;

registering, by the server, the specific currency-issuing transaction in a private blockchain network;

providing, by the server, a specific currency-issuing private transaction ID that represents location information of the specific currency-issuing transaction in the private blockchain network to the currency issuer and the currency receiver;

updating, by the server, a balance database using an amount of a balance change caused by the issued amount included in the specific currency-issuing transaction by updating a balance of all transactions in the balance database according to the issued amount of the cryptocurrency;

(b) determining, by the server, that an anchoring condition for registering function values in a public blockchain network is satisfied;

generating, by the server, a first specific representative function value, wherein generating the first specific representative function value comprises:

generating a specific function value by applying a specific function to the specific unique nonce, the currency receiver ID, the issued amount of the cryptocurrency, the public key of a currency issuer, and the signature value of the currency issuer;

generating a specific associated function value by applying the specific function to one of (i) information on an amount of a total change in balances of the balance database representing a difference between a state of the balance database at a time of completion of an n-th block of the private blockchain network and a state of the balance database at a time of completion of an (n-1)-th block of the private blockchain network and (ii) information on each of the balances of the balance database; and generating the first specific representative function value based on the specific function value and the specific associated function value;

registering, by the server, the first specific representative function value in the public blockchain network; and acquiring, by the server, a specific currency-issuing public transaction ID representing location information of the first specific representative function value in the public blockchain network, wherein each state of the balance database is identified by each of private transaction IDs representing each piece of location information corresponding to all the transactions registered in the n-th block.

2. The method of claim 1, wherein, at the step of (b), the anchoring condition is one of (i) a condition that a certain number of the transactions related to the cryptocurrency is generated, (ii) a condition that a certain amount of time has elapsed, (iii) a condition that the n-th block is created in the private blockchain network, and (iv) a condition about at least one of characteristics of services.

3. The method of claim 2, wherein the server registers a header function value in a block header of the n-th block when the n-th block is created in the private blockchain network, and wherein the header function value is a function value calculated from one of information on each balance in the n-th block and information on the amount of the total change of the balances in the n-th block.

4. The method of claim 3, wherein, at the step of (b), on condition that (i) a currency-issuer representative function value has been generated by using a first specific tree of a specific type whose leaf nodes include function values calculated from at least one specific random nonce, at least one signature value of the specific random nonce, and at least one public key of the currency issuer, (ii) a currency-trading representative function value has been generated by using a second specific tree of the specific type whose leaf nodes include function values calculated from all the transactions related to issue and use of the cryptocurrency, and that (iii) the currency-issuer representative function value and the currency-trading representative function value have been further registered in the block header of the n-th block, the server registers the header function value, the currency-issuer representative function value and the currency-trading representative function value in the public blockchain network.

5. The method of claim 3, wherein, at the step of (b), on condition that (i) a private representative function value has been generated from a specific tree of a specific type whose leaf nodes include (i-1) at least one function value calculated from at least one specific random nonce, (i-2) at least one signature value of the specific random nonce and at least one public key of the currency issuer, and (i-3) at least one function value calculated from all the transactions related to issue and use of the cryptocurrency, and that (ii) the private representative function value has been further registered in the block header of the n-th block, the server registers the header function value and the private representative function value in the public blockchain network.

6. The method of claim 1, wherein, at the step of (b), the server performs (i) creating at least one specific tree of a specific type, including the specific function value in one specific leaf node of the specific tree, and including the specific associated function value in at least one of other leaf nodes corresponding to the specific leaf node, and wherein the generating of the first specific representative function value based on the specific function value and the specific associated function value comprises generating the first specific representative function value based on the specific function value in the specific leaf node and the specific associated function value in the at least one of the other leaf nodes corresponding to the specific leaf node.

7. The method of claim 6, wherein the specific tree is a first tree among two or more specific trees linked in chains, then a function value of a message data, which includes one or more of text, numbers, and symbols, is allocated to a first leaf node of the specific tree.

8. The method of claim 1, wherein the server stores the specific function value and the associated function values in a first data structure and then stores and manages a second data structure identical in form to the first data structure.

9. The method of claim 8, wherein the first data structure and the second data structure are of a specific type, a representative value of the first data structure is allocated to a first leaf node of the second data structure.

10. The method of claim 1, wherein, at the step of (a), the server determines that a data format of the specific currency-issuing transaction, the public key of the currency issuer, and the signature value of the currency issuer are valid, to thereby determine whether the specific currency-issuing transaction is valid, and wherein the specific unique nonce is confirmed as having been used in another currency-issuing transaction, the server determines that the specific currency-issuing transaction is not valid.

11. The method of claim 1, before the step of (a), further comprising steps of:
  (a01) acquiring at the server a request for registration of the currency issuer using the public key of the currency issuer, determining that the currency issuer is valid, and transmitting a specific random nonce to the valid currency issuer;
  (a02) acquiring at the server a signature value of the specific random nonce generated by signing the specific random nonce with the private key of the currency issuer and (I) determining that the signature value of the specific random nonce is valid by using the public key of the currency issuer, (II) registering at least one issuer-registering transaction, including (1) the specific random nonce, (2) the signature value of the specific random nonce, and (3) the public key of the currency issuer, in the public blockchain network, and (III) providing an issuer-registering private transaction ID representing location information of the issuer-registering transaction in the private blockchain network to the currency issuer; and
  (a03) registering a second representative function value in the public blockchain network, wherein the second representative function value is generated by using (i) a particular function value created by applying the specific function to the issuer-registering transaction and (ii) its at least one corresponding particular associated function value, and acquiring an issuer-registering public transaction ID representing location information of the second representative function value in the public blockchain network.

12. A server for issuing a cryptocurrency, comprising:
  at least one memory that stores instructions; and
  at least one processor,
  the instructions, when executed by the at least one processor, cause the at least one processor to perform processes of:
  (I) acquiring a specific currency-issuing transaction comprising (i) a specific unique nonce, (ii) a currency receiver ID to receive a specific amount of the cryptocurrency, (iii) an issued amount of the cryptocurrency, (iv) a public key of a currency issuer, and (v) a signature value of the currency issuer generated by signing (i), (ii), (iii), and (iv) with a private key of the currency issuer;
  determining that the specific currency-issuing transaction and the currency issuer are valid;
  registering the specific currency-issuing transaction in a private blockchain network;
  providing a specific currency-issuing private transaction ID, that represents location information of the specific currency-issuing transaction in the private blockchain network to the currency issuer and the currency receiver;
  updating a balance database using an amount of a balance change caused by the issued amount included in the specific currency-issuing transaction by updating a balance of all transactions in the balance database according to the issued amount of the cryptocurrency;
  (II) determining that an anchoring condition used for registering function values in a public blockchain network is satisfied;
  generating a first specific representative function value wherein generating the first specific representative function value comprises:
    generating a specific function value by applying a specific function to the specific unique nonce, the currency receiver ID, the issued amount of the cryptocurrency, the public key of a currency issuer, and the signature value of the currency issuer;
    generating a specific associated function value by applying the specific function to one of (i) information on an amount of a total change in balances of the balance database representing a difference between a state of the balance database at a time of completion of an n-th block of the private blockchain network and a state of the balance database at a time of completion of an (n-1)-th block of the private blockchain network and (ii) information on each of the balances of the balance database; and
    generating the first specific representative function value based on the specific function value and the specific associated function value;
  registering the first specific representative function value in the public blockchain network; and
  acquiring a specific currency-issuing public transaction ID representing location information of the first specific representative function value in the public blockchain network,
  wherein each state of the balance database is identified by each of private transaction IDs representing each piece of location information corresponding to all the transactions registered in the n-th block.

13. The server of claim 12, wherein, at the process of (II), the anchoring condition is one of (i) a condition that a certain number of the transactions related to the cryptocurrency is generated, (ii) a condition that a certain amount of time has elapsed, (iii) a condition that the n-th block is created in the private blockchain network, and (iv) a condition about at least one of characteristics of services.

14. The server of claim 13, wherein the processor registers a header function value in a block header of the n-th block when the n-th block is created in the private blockchain network, and wherein the header function value is a function value calculated from one of information on each balance in the n-th block and information on the amount of the total change of the balances in the n-th block.

15. The server of claim 12, wherein, at the process of (II), the processor performs (i) creating at least one specific tree of a specific type, including the specific function value in one specific leaf node of the specific tree, and including the specific associated function value in at least one of other leaf nodes corresponding to the specific leaf node, and wherein the generating of the first specific representative function value based on the specific function value and the specific associated function value comprises generating the first specific representative function value based on the specific function value in the specific leaf node and the specific associated function value in the at least one of the other leaf nodes corresponding to the specific leaf node.

16. The server of claim 12, wherein, before the process of (I), the processor further executes the instructions to perform processes of:
  (I01) acquiring a request for registration of the currency issuer using the public key of the currency issuer, determining that the currency issuer is valid, and transmitting a specific random nonce to the valid currency issuer;
  (I02) acquiring a signature value of the specific random nonce generated by signing the specific random nonce with the private key of the currency issuer, and (I) determining that the signature value of the specific random nonce is valid by using the public key of the currency issuer, (II) registering at least one issuer-registering transaction, including (1) the specific random nonce, (2) the signature value of the specific random nonce, and (3) the public key of the currency issuer, in the public blockchain network, and (III) providing an issuer-registering private transaction ID representing location information of the issuer-registering transaction in the private blockchain network to the currency issuer; and (I03) registering a second representative function value in the public blockchain network, wherein the second representative function value is generated by using (i) a particular function value created by applying the specific function to the issuer-registering transaction and (ii) its at least one corresponding particular associated function value, and acquiring an issuer-registering public transaction ID representing location information of the second representative function value in the public blockchain network.

\* \* \* \* \*